2,943,077
COPOLYMERS OF ETHYLENE AND SULFUR DIOXIDE

Rudolf Bauke de Jong and Ivan Maxwell Robinson, Wilmington, Del., assignors to E. I. du Pont de Nemours and Company, Wilmington, Del., a corporation of Delaware No Drawing. Filed Nov. 1, 1956, Ser. No. 619,695

8 Claims. (Cl. 260—79.3)

The present invention relates to a process of preparing ethylene-sulfur dioxide copolymers and to novel ethylene-sulfur dioxide copolymers.

The copolymerization of olefins and sulfur dioxide with free radical catalysts has heretofore in general given rise to copolymers having a 1:1 ratio of olefin to sulfur dioxide in the polymer chain. The regularity of the polymer structure has given rise to the belief that the sulfur dioxide forms a complex with the olefin, and the polymers obtained are the result of the homopolymerization of that complex. Ethylene-sulfur dioxide copolymers obtained from such a polymerization are intractable, brittle copolymers. Since polyethylene is a very tough and resilient polymer, improved copolymers of ethylene and sulfur dioxide should result if the ratio of ethylene to sulfur dioxide in the copolymer could be increased to beyond one. This greater than one ratio of ethylene to sulfur dioxide can, of course, be achieved in several ways. One of these is through graft copolymers in which long and short polyethylene chains are attached to the main copolymer chain of the 1:1 ethylene-sulfur dioxide molecule. However, on the basis of the work reported in this patent application, the preferred copolymers appear to be those in which the sulfur dioxide molecules are separated from each other by more than one ethylene unit in at least part of the polymer molecule.

It is, therefore, the object of the present invention to prepare copolymers of ethylene and sulfur dioxide having ethylene-sulfur dioxide ratios of greater than one. It is a further object of the present invention to prepare copolymers of ethylene and sulfur dioxide wherein at least part of the sulfur dioxide chain units are separated by more than one ethylene chain unit. It is a further object to provide a novel process for preparing olefin-sulfur dioxide copolymers. It is yet another object to provide a process in which the rate of addition of sulfur dioxide to the growing copolymer can be controlled. Other objects will become apparent hereinafter.

The objects of the present invention are accomplished by polymerizing an olefin, and, in particular, ethylene in the presence of an aqueous solution of bisulfite ions. In the preferred process of the present invention, which results in ethylene-rich sulfur dioxide copolymers of greatly improved properties, ethylene is polymerized with a free radical catalyst and preferably with a water insoluble free radical catalyst in the presence of an aqueous solution of bisulfite ions maintained at a pH of 3.5 to 9.5, and preferably at a pH of 5.5 to 8.

The major problem in the copolymerization of ethylene and sulfur dioxide to copolymers with mol ratios of ethylene to sulfur dioxide of greater than one is to find polymerization conditions in which the rate of polymerization of the ethylene with itself is greater than with sulfur dioxide or greater than the rate of polymerization of an ethylene-sulfur dioxide complex. The present invention is based on the discovery that the aqueous bisulfite equilibrium within a certain pH range will give rise to a sufficiently low concentration of sulfur dioxide in the polymerization phase, so that the polymerization of ethylene with itself is faster than the formation of 1:1 ethylene-sulfur dioxide copolymers and that consequently the formation of ethylene-rich sulfur dioxide polymers can occur. The critical conditions stated hereinabove are necessary only where it is desired to prepare copolymers which contain polymeric units having more than one ethylene group between the sulfur dioxide units. Ethylene-sulfur dioxide copolymers having a 1:1 monomer ratio are readily prepared outside the critical conditions listed. Control of the concentration of sulfur dioxide is a critical factor in the preparation of ethylene-sulfur dioxide copolymers having a higher concentration of ethylene than 1:1 in the copolymer. The quantity of free sulfur dioxide available for polymerization in or from the aqueous solution is controlled by the pH of the aqueous solution in the process of the present invention.

The bisulfite ion employed in the process of the present invention may be obtained from a large number of bisulfite salts. Preferred bisulfite salts are the alkali metal and alkaline earth metal salts since they are readily available and low in cost. It is, however, not necessary to employ a bisulfite salt to obtain the bisulfite ion, but it is possible to form the bisulfite ion in situ through the reaction of a sulfite salt and a weak acid such as carbon dioxide. This means of obtaining the bisulfite ion for the polymerization is particularly preferred since this mixture acts also as a buffering system maintaining the pH of the solution at the desired level. Another buffering system comprises a mixture of sulfite and bisulfite salt. The novel copolymers of the present invention in which the ethylene to sulfur dioxide ratio is greater than one require the presence of a buffering agent in the aqueous bisulfite solution to maintain the pH value in a range of 3.5–9, and preferably at a pH value of 5.5–8. The preferred buffering systems contain mixtures of soluble sulfite and bisulfite salts such as those from alkali metals, although other buffering systems can be employed if desired.

The quantity of the bisulfite salt employed is generally in excess of the quantity of the sulfur dioxide, assuming complete conversion of the bisulfite salt to sulfur dioxide, required for the copolymerization. It is preferred to employ a quantity of the bisulfite salt, such that, although some of the sulfur dioxide is used up in the polymerization, the equilibrium concentrations of sulfur dioxide to bisulfite ion remain essentially unchanged. This gives rise to a constant concentration of sulfur dioxide in the polymerization phase and gives rise to homogeneous copolymer. The availability of sulfur dioxide is, therefore, primarily controlled by the sulfur dioxide-bisulfite system as such and is modified by the pH of the system.

The polymerization temperature may be varied greatly and temperatures from 0° C. to 300° C. may be employed to prepare the preferred copolymers of ethylene and sulfur dioxide of the present invention; however, preferred temperatures are from 40 to 250° C. At temperatures below 100° C. the copolymers obtained are more linear in structure than copolymers prepared at temperatures above 150° C., due to the increased chain transfer activity of the ethylene at elevated temperatures. The ethylene pressure may be greatly varied and pressures employed heretofore in the copolymerization of olefins and sulfur dioxide may be employed in the process of the present invention. However, as stated hereinabove, it is desirable to use high ethylene polymerization rates. These are obtained at higher pressures, and thus pressures exceeding 500 atmospheres are generally employed to prepare the ethylene-rich sulfur dioxide copolymers.

The polymerization of ethylene with the sulfur dioxide obtained from a bisulfite system may be initiated by a free radical catalyst such as a peroxide or an azo compound. The ethylene rich sulfur dioxide copolymers are preferably prepared with a water insoluble free radical catalyst indicating possibly that the polymerization does not occur in the liquid phase but in the gas phase. Preferred polymerization catalysts are azo catalysts such as disclosed in U.S. Patent 2,471,959, issued May 31, 1949, to M. Hunt. The quantity of the catalyst may be varied and is in accordance with amounts employed heretofore in the polymerization of ethylene and sulfur dioxide. In general, the amount of catalyst may vary from 0.001% to 10% by weight of the monomer.

The polymerization is preferably carried out in the presence of an aqueous phase in which the bisulfite is dissolved. Although it is possible to obtain copolymers of ethylene and sulfur dioxide in the presence of an organic phase, such as benzene or cyclohexane, polymeric materials with less homogeneity are usually obtained, e.g., ethylene-rich sulfur dioxide copolymers together with mixtures of polyethylene and some 1:1 ethylene-sulfur dioxide copolymers.

The process of the present invention is further illustrated by the following examples:

Example I

Into a 330 ml. stainless steel autoclave was charged 0.2 g. of $\alpha,\alpha'$-azo-bis(cyclohexane carbonitrile), and 84 ml. of water containing 28 g. of sodium bisulfite and 25 g. of sodium sulfite. The reaction mixture was heated to 85° C. and ethylene was added to the autoclave until a pressure of 850 to 950 atmospheres was obtained. The reaction mixture was agitated for two hours at that temperature while pressure was maintained. The reaction mixture was then cooled to room temperature and excess monomer vented off. The reaction mixture was filtered and the polymer obtained from the filtration was washed with water and dried. The yield of the dry polymer was 6 g. The polymer was found to contain 35% of sulfur dioxide as determined by sulfur analysis. The ethylene-sulfur dioxide copolymers could be molded at 180° C. into flexible films. The copolymer was subjected to extraction with refluxing benzene. No polyethylene was extracted from the product. The ratio of ethylene to sulfur dioxide was not changed by the extraction indicating that the copolymer was a homogeneous product.

Example II

Into a 330 ml. stainless steel autoclave was charged 0.2 g. of diazoaminobenzene, and 84 ml. of water containing 28 g. of sodium bisulfite and 25 g. of sodium sulfite. The autoclave was heated to 140° C. and pressured with ethylene until a pressure of 900 atmospheres was obtained. Maintaining pressure and temperature, the autoclave was agitated for a period of 2 hours. On cooling to room temperature and venting off excess monomer, the reaction mixture was filtered and the filtrate washed and dried. A polymeric product weighing 6 g. was obtained. Sulfur analysis showed the polymer to contain 7% of sulfur dioxide. The copolymer could be molded into tough films which could be cold drawn 700%. The polymer remained unchanged by extraction with boiling benzene.

Example III

Into a 330 ml. stainless steel autoclave was charged 0.2 g. $\alpha,\alpha'$-azo-bis(cyclohexane carbonitrile), 100 ml. of water containing 25 g. potassium sulfite and 20 g. of carbon dioxide. The autoclave was heated to 85° C. and pressured with ethylene until a pressure of 900 atmospheres was obtained. The autoclave was agitated for a period of two hours while pressure and temperature was maintained. The autoclave was then cooled to room temperature and excess ethylene was removed. The reaction mixture was filtered and the polymeric product obtained was washed and dried. The dry polymer weighed 5 g. and was found to contain 15 weight percent of sulfur dioxide.

Example IV

Into a 330 ml. stainless steel autoclave was charged 0.2 g. of $\alpha,\alpha'$-azo-bis(cyclohexane carbonitrile), 100 ml. of water containing 20 g. of magnesium sulfite, and 20 g. of carbon dioxide. The autoclave was then heated to 85° C. and pressured with ethylene until a pressure of 900 atmospheres was obtained. The autoclave was agitated for two hours while maintaining temperature and pressure. The autoclave was then cooled to room temperature and excess monomer was vented off. The reaction mixture was filtered and the filtrate washed and dried. The dry polymer weighed 4 g. Sulfur analysis showed the polymer to contain 10 weight percent of sulfur dioxide.

Example V

Into a 450 ml. stainless steel autoclave was charged 0.05 g. of $\alpha,\alpha'$-azo-bis(isobutyronitrile) in 2 ml. of ethyl acetate, 168 ml. of water containing 58 g. of sodium bisulfite and 50 g. of sodium sulfite. The reaction mixture was heated to 65° C. and the autoclave was pressured with ethylene to 1800 to 2000 atmospheres. The reaction was continued for 2 hours. After filtration from the reaction mixture, washing and drying there was obtained 7.5 g. of a polymer which was identified as an ethylene-sulfur dioxide polymer containing 42% sulfur dioxide. The polymer could be molded into tough stiff films by heating the polymer to 210° C. for 2 minutes under pressure.

Example VI

Into a 450 ml. stainless steel autoclave was charged 0.05 g. of lauryl peroxide in 2 ml. of ethyl acetate, 168 ml. of water containing 58 g. of sodium bisulfite and 50 g. of sodium sulfite. The reaction mixture was heated to 56° C. and the autoclave was pressured with ethylene to 1800 to 2000 atmospheres. The reaction was continued for 2 hours. After filtration from the reaction mixture, washing and drying, 4.7 g. of a polymeric product was obtained. The polymer was identified as a copolymer of ethylene and sulfur dioxide containing approximately 44% of sulfur dioxide in the copolymer. The polymer could be molded into tough films.

Under the preferred polymerization conditions discussed hereinabove and illustrated in the examples, novel ethylene-rich sulfur dioxide copolymers are obtained which have greatly improved physical properties as compared to the 1:1 copolymers of ethylene and sulfur dioxide prepared heretofore. The improved properties of these novel copolymers result from the increase in the ethylene concentration in the polymer chain. The copolymers of the present invention are neither mixtures of polyethylene and 1:1 ethylene-sulfur dioxide copolymers nor are they graft copolymers which have a 1:1 ethylene-sulfur dioxide backbone with polyethylene side chains. In the copolymers of the present invention the additional ethylene of the copolymer is incorporated into the main polymer chain such that sulfur dioxide molecules are separated by more than one ethylene unit in the chain. Thus in contrast to ethylene-rich copolymers which contain mixtures of the 1:1 copolymer and polyethylene, the copolymers of the present invention cannot be separated into polyethylene and 1:1 ethylene-sulfur dioxide copolymers by heating in hydrocarbon solvents, but retain their ethylene-sulfur dioxide ratio even after repeated extractions. The sulfur dioxide content of the copolymer is readily obtained employing known methods for the analysis of sulfur in the copolymer. In contrast to the 1:1 ethylene-sulfur dioxide copolymers of the prior art the copolymers of the present invention are soluble in dimethyl sulfoxide. The structure of the copolymers of the present invention was further established by degradation studies in which the gaseous product and the residue obtained from the degrading polymer were analyzed. Results from the degradation of the novel copolymers of the present invention show that the ratio of ethylene to sulfur dioxide decreases as the degradation time increases indicating that ethylene is replaced by other hydrocarbon compounds, some of which have been analyzed to be butadiene and hexadiene. This is in contrast to the 1:1 copolymers of ethylene and sulfur dioxide and those ethylene-rich sulfur dioxide copolymers which have a 1:1 copolymer chain but polyethylene branches. The degradation products of these copolymers have a constant ratio of ethylene to sulfur dioxide indicating a 1:1 copolymer. Thus, according to these studies, the copolymers of the present invention contain structural units having the following formula:

$$-SO_2-(CH_2-CH_2)_n-$$

wherein $n$ is a number greater than one. The copolymers of the present invention are thus different from the prior art in this structural feature of the polymer chain. A further significant difference between the ethylene-sulfur dioxide copolymers of the prior art and those of the present invention is the improved stability of the ethlyene-rich sulfur dioxide copolymers. Thus the prior art copolymers of ethylene and sulfur dioxide become intractable and brittle when molding at elevated temperatures is attempted. The polymers of the present invention are, however, sufficiently heat stable to be molded into tough cold drawable products.

The mechanical properties of the copolymers of the present invention will vary with the sulfur dioxide content. As the sulfur dioxide content is increased, the copolymers become stiffer and less drawable. At low concentration of sulfur dioxide, the copolymers are tough, flexible products which can be cold drawn. The softening point of ethylene-rich sulfur dioxide will vary similarly with the sulfur dioxide content. Copolymers having very high sulfur dioxide contents (46–49%) have softening points at about 230° C., whereas polymers having less than 10% sulfur dioxide have softening points at about 120° C.

The process of the present invention provides a method for preparing novel ethylene-rich sulfur dioxide copolymers with greatly improved properties. The process of the present invention can furthermore be employed to copolymerize sulfur dioxide with terminally unsaturated olefins such as propylene, butene-1, isobutylene and other aliphatic hydrocarbon monomers. The process of the present invention may also be employed to prepare copolymers of sulfur dioxide with more than one olefin, such as mixtures of ethylene and propylene. The copolymers of the present invention can be injection molded and melt extruded at temperatures of 180° to 220° C. and thus fabricated into massive articles, films and fibers having a large number of applications. The copolymers may be blended with other polymers. Fillers or pigments are readily added. Foams may be prepared from the polymer by addition of a suitable blowing agent.

We claim:
1. A process for the preparation of ethylene sulfur dioxide copolymers which comprises polymerizing ethylene in a reactor in the presence of an aqueous solution of bisulfite ions maintained at a pH of 5 to 8 with a water-insoluble, free-radical forming polymerization catalyst, said aqueous solution comprising at least 25% of the reactor volume, said catalyst being employed in a quantity of 0.001 to 10 percent by weight of monomer, at a temperature of 40 to 250° C. and a pressure above 200 atmospheres, said bisulfite ion being obtained from bisulfite-forming salts, selected from the class consisting of sulfites and bisulfites of alkali and alkaline earth metals, said bisulfite-forming salts being employed in a concentration of 20 to 64% by weight of the aqueous medium, and recovering a solid copolymer of ethylene and sulfur dioxide.

2. The process as set forth in claim 1 wherein the bisulfite ion is formed from an alkali metal bisulfite.

3. The process as set forth in claim 1 wherein the bisulfite ion is formed from the reaction of the said sulfite and carbon dioxide.

4. The process as set forth in claim 1 wherein the bisulfite ion-forming salt is a combination of alkali metal bisulfite and alkali metal sulfite.

5. A process for the preparation of ethylene sulfur dioxide copolymers which comprises polymerizing ethylene in a reactor at a temperature of 56° to 140° C. and a pressure above 200 atmospheres, in the presence of an aqueous solution of bisulfite ions maintained at a pH of 5 to 8 with a water-insoluble, free-radical forming polymerization catalyst, said aqueous solution comprising at least 25% of the reactor volume, said catalyst being employed in a quantity of 0.001 to 10 percent by weight of monomer, said bisulfite ion being obtained from bisulfite-forming salts, selected from the class consisting of sulfites and bisulfites of alkali and alkaline earth metals, said bisulfite-forming salt being employed in a concentration of 20 to 64% by weight of the aqueous medium and recovering a copolymer of ethylene and sulfur dioxide.

6. The process as set forth in claim 5 wherein the catalyst is an organic azo compound.

7. The process as set forth in claim 5 wherein the catalyst is a peroxide.

8. The process as set forth in claim 5 wherein the pH is maintained at a level of 5 to 8 by addition of a metal sulfite.

References Cited in the file of this patent

UNITED STATES PATENTS 2,391,218    Bacon _____ Dec. 18, 1945
2,507,526    Jacobson _____ May 16, 1950